(12) United States Patent
Merkel

(10) Patent No.: US 9,452,668 B2
(45) Date of Patent: Sep. 27, 2016

(54) MOUNTING FRAME FOR AN ELECTRICALLY DRIVEN MOTOR VEHICLE

(71) Applicant: Dr. Ing. h.c. F. Porsche Aktiengesellschaft, Stuttgart (DE)

(72) Inventor: Timo Fabian Merkel, Weissach (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/302,868

(22) Filed: Jun. 12, 2014

(65) Prior Publication Data

US 2015/0360549 A1    Dec. 17, 2015

(30) Foreign Application Priority Data

Jun. 13, 2013 (DE) .......................... 10 2013 106 141

(51) Int. Cl.
| | | |
|---|---|---|
| *B62D 21/15* | (2006.01) | |
| *B60K 1/00* | (2006.01) | |
| *B60K 5/12* | (2006.01) | |
| *B60K 17/12* | (2006.01) | |
| *B62D 21/11* | (2006.01) | |
| *B60K 1/04* | (2006.01) | |

(52) U.S. Cl.
CPC . *B60K 1/00* (2013.01); *B60K 1/04* (2013.01); *B60K 5/1216* (2013.01); *B60K 17/12* (2013.01); *B62D 21/11* (2013.01); *B62D 21/152* (2013.01); *B60K 2001/001* (2013.01); *B60K 2001/0438* (2013.01)

(58) Field of Classification Search
CPC   B60K 1/00; B60K 2001/001; B60K 5/1216; B60K 17/12; F16F 7/003; B62D 21/02; B62D 21/152; B60R 2019/1866
See application file for complete search history.

(56) References Cited

U.S. PATENT DOCUMENTS

| | | | | |
|---|---|---|---|---|
| 3,702,202 | A * | 11/1972 | Rumsey | .......................... 93/135 |
| 6,116,587 | A * | 9/2000 | Miyahara | ............. B60K 5/1216 |
| | | | | 267/140.12 |
| 6,994,178 | B2 * | 2/2006 | Mizuno | ......................... 429/430 |
| 7,562,737 | B2 * | 7/2009 | Miyahara et al. | ............ 180/291 |
| 7,588,117 | B2 * | 9/2009 | Fukuda | ......................... 180/291 |

(Continued)

FOREIGN PATENT DOCUMENTS

| | | |
|---|---|---|
| DE | 10154353 | 5/2002 |
| DE | 102005052307 | 5/2007 |

(Continued)

OTHER PUBLICATIONS

German Search Report of Jan. 14, 2014.

*Primary Examiner* — Emma K Frick
(74) *Attorney, Agent, or Firm* — Gerald E. Hespos; Michael J. Porco; Matthew T. Hespos

(57) ABSTRACT

A mounting frame (20) for an electrically driven motor vehicle (10) has two longitudinal beams (30, 32) oriented in a longitudinal direction (18) of the motor vehicle (10). An electric drive unit (22) for driving the motor vehicle (10) is mounted on the longitudinal beams (30, 32). The longitudinal beams (30, 32) form a frame arrangement that is open out in the longitudinal direction (18). A flexurally stiff hollow body (28) is formed separately from the longitudinal beams (30, 32) and is fixed to the mounting frame (20). The hollow body (28) is arranged between the longitudinal beams (30, 32) and is mechanically fixedly connected to the longitudinal beams (30, 32) to form a closed frame section.

16 Claims, 3 Drawing Sheets

(56) References Cited

U.S. PATENT DOCUMENTS

| | | | |
|---|---|---|---|
| 7,802,839 B2* | 9/2010 | Ajisaka | 296/187.09 |
| 7,886,861 B2* | 2/2011 | Nozaki et al. | 180/232 |
| 8,522,909 B2* | 9/2013 | Niina | 180/299 |
| 8,651,216 B2* | 2/2014 | Wakatsuki et al. | 180/291 |
| 2004/0222031 A1 | 11/2004 | Szalony et al. | |
| 2005/0194773 A1* | 9/2005 | Yamada et al. | 280/752 |
| 2007/0215397 A1* | 9/2007 | Suzuki | 180/65.3 |
| 2011/0132676 A1* | 6/2011 | Kodaira | 180/65.51 |
| 2014/0311812 A1* | 10/2014 | Kambayashi | 180/65.1 |
| 2014/0374176 A1* | 12/2014 | Merkel et al. | 180/65.1 |
| 2015/0027795 A1* | 1/2015 | Hirai et al. | 180/60 |

FOREIGN PATENT DOCUMENTS

| | | |
|---|---|---|
| DE | 10 2011 012 249 | 8/2012 |
| DE | 10297133 | 5/2013 |
| WO | 2013057017 | 4/2013 |

* cited by examiner

MOUNTING FRAME FOR AN ELECTRICALLY DRIVEN MOTOR VEHICLE

CROSS REFERENCE TO RELATED APPLICATION

This application claims priority under 35 USC 119 to German Patent Appl. No. 10 2013 106 141.9 filed on Jun. 13, 2013, the entire disclosure of which is incorporated herein by reference.

BACKGROUND

1. Field of the Invention

The invention relates to a mounting frame for an electrically driven motor vehicle having two longitudinal beams that are oriented in a longitudinal direction of the motor vehicle. An electric drive unit for driving the motor vehicle is mounted on the longitudinal beams. The longitudinal beams form a frame arrangement that is open out in the longitudinal direction. A flexurally stiff hollow body is formed separately from the longitudinal beams and is fixed to the mounting frame.

2. Description of the Related Art

US 2004/0090085 discloses a mounting frames for fixedly mounting drive components of an electrically driven motor vehicle on a supporting frame or a chassis of the motor vehicle. The mounting frame has two parallel and free longitudinal beams that extend in the longitudinal direction of the motor vehicle. A mounting cradle is arranged on the longitudinal beams, and an electric control unit is arranged in the mounting cradle at a position above the longitudinal beams. The mounting cradle for mounting the electric control unit can absorb little deformation energy in the event of the motor vehicle being involved in a collision. Thus, the mounting cradle and the electric control unit do not increase the stability of the mounting frame in general and make no contribution to passive safety.

The absence of components of an internal combustion engine and/or a transmission unit in an electric motor vehicle reduces the stability of the motor vehicle supporting frame, and additional stiffening means are required to ensure passive safety for the occupants in the event of the motor vehicle being involved in a collision.

The object of the invention is to provide a mounting frame for an electrically driven motor vehicle, where the mounting frame increases the passive safety of the occupants with little technical outlay.

SUMMARY OF THE INVENTION

The invention relates to a mounting frame for an electrically driven motor vehicle having two longitudinal beams that are oriented in a longitudinal direction of the motor vehicle. The mounting frame has a hollow body arranged between the longitudinal beams and is connected fixedly to the longitudinal beams to form a closed frame section.

The invention also relates to an electrically driven motor vehicle having a supporting frame and a mounting frame. The mounting frame is arranged on the supporting frame of the motor vehicle and is connected fixedly to the supporting frame.

The longitudinal beams form a frame arrangement that is open outward in the longitudinal direction or toward an end of the motor vehicle. Thus, the mounting frame can be produced with little technical outlay. The hollow body and the electric drive unit are connected fixedly to the two frame beams to form the closed frame section and hence function to stiffen the mounting frame in general. More particularly, the longitudinal beams, the hollow body and the electric drive unit form a block that increases the mechanical rigidity of the mounting frame. The electric drive unit and the hollow body form a stable unit together with the longitudinal beams. Thus, the mounting frame can ensure the required passive safety and controlled deformation behavior in the event of a collision of the electrically driven motor vehicle despite the absence of massive components of an internal combustion engine drivetrain.

The hollow body preferably is fixed to the longitudinal beams by connecting means. In this way, the mounting frame can be fit with the electric drive unit with little technical outlay. The required stiffening of the mounting frame is achieved by subsequent fixing of the hollow body.

The hollow body and the drive unit may be mounted one behind the other or offset with respect to one another in the longitudinal direction on the longitudinal beams. Additionally, the hollow body may be offset outward in the longitudinal direction, or toward an end section of the motor vehicle, with respect to the drive unit. In this way, the closed frame section is formed around the electric drive unit. As a result, the electric drive unit is protected against damage in the event of the motor vehicle being involved in a collision, so that the hazard posed by overvoltages is reduced.

An electrical energy store for the supply of electrical energy to the drive unit may be mounted on the longitudinal beams, and the hollow body may be offset outward with respect to the electrical energy store in the longitudinal direction. In this way, the energy store is protected mechanically in the event of a collision.

Stiffening struts may be formed in the hollow body to increase mechanical stability of the hollow body in the longitudinal direction. In this way, the mechanical stability of the hollow body can be increased without the weight of the motor vehicle being increased significantly.

The hollow body also may be filled with a low density material that exhibits good characteristics in the event of a crash, for example a honeycomb structure.

The stiffening struts may extend in radiant or V-shaped fashion into the hollow body proceeding from a mounting point at which the hollow body is mounted on one of the longitudinal beams. In this way, energy generated in the event of a collision can be transmitted efficiently via the stiffening struts to the longitudinal beams, so that the collision energy can be dissipated.

An adaptation element may be arranged between the hollow body and the electric drive unit. Thus, deformation energy generated in the event of a collision can be exchanged between hollow body and the electric drive unit, and the block formation can be improved.

The adaptation element may have a concavely curved surface that faces toward the drive unit. In this way, improved mechanical contact can be formed between the adaptation element and the drive unit, thereby improving the block formation by the hollow body and the electric drive unit.

The adaptation element may be formed from plastic. In this way, in the event of the motor vehicle being involved in a collision, deformation energy can be absorbed efficiently, and the weight of the adaptation element is limited.

Alternatively, the adaptation element may be formed from metal. Thus, further block formation can be achieved. The mass of the adaptation element thereby increases passive safety.

The adaptation element may have a honeycomb structure. In this way, an adaptation element made of metal can be provided with a low weight.

An electrical component of the motor vehicle can be accommodated in the hollow body. Thus, the structural space of the hollow body can be utilized, and the flexural stiffness of the hollow body can be increased.

The hollow body may be a closed hollow body. In this way, the mechanical stiffness of the hollow body can be increased, and any electrical component arranged in the hollow body can be fully enclosed and protected.

The features mentioned above and the features yet to be explained below can be used in the specified combination, and also in other combinations or individually, without departing from the scope of the invention.

Exemplary embodiments of the invention are illustrated in the drawings and will be explained in more detail in the following description.

DETAILED DESCRIPTION OF THE PREFERRED EMBODIMENTS

Figure 1:
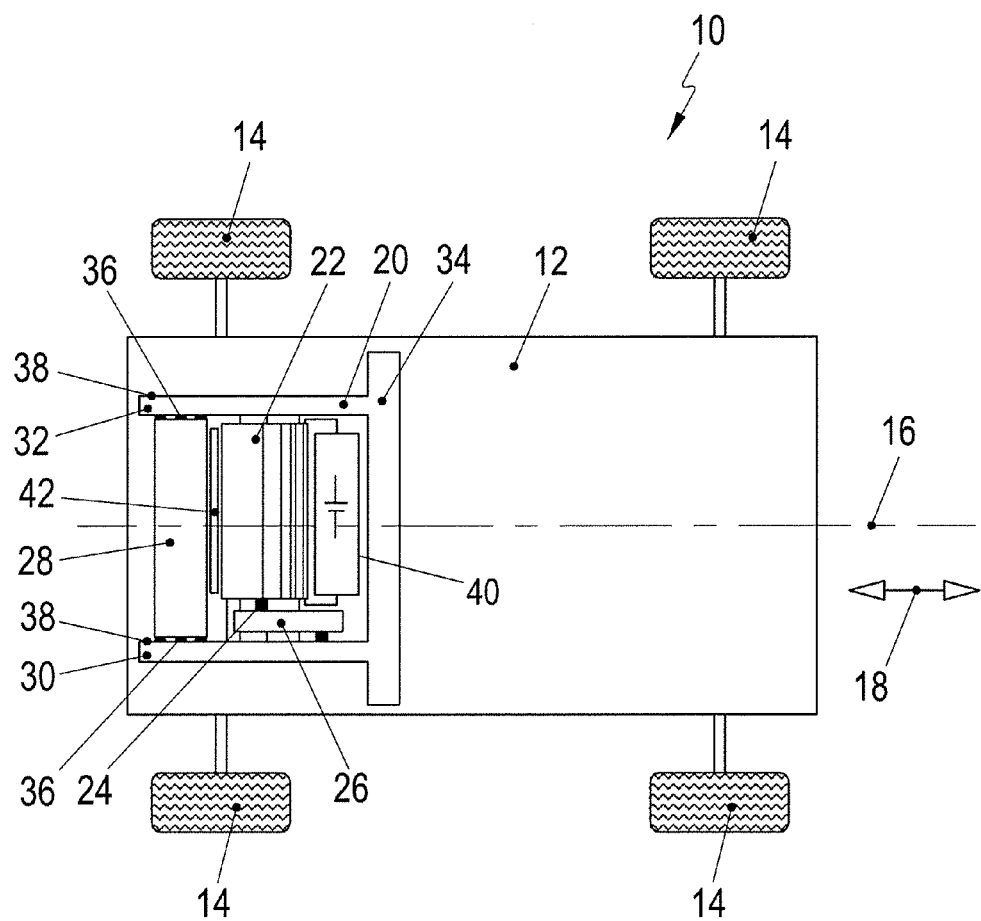
FIG. 1 is a schematic illustration of a motor vehicle having a mounting frame for the mounting of an electric drive machine.

An electrically driven motor vehicle is illustrated schematically in FIG. 1 and is denoted as a whole by 10. The motor vehicle 10 has a supporting frame 12 on which wheels 14 of the motor vehicle 10 are mounted. The motor vehicle 10 generally has a longitudinal axis 16 and moves substantially in a longitudinal direction parallel to the longitudinal axis 16, as indicated by an arrow 18.

A mounting frame 20 is fixed to the supporting frame 12 for mounting electric drive components of the motor vehicle 10. An electric drive machine 22 is mounted on the mounting frame 20 and a shaft 24 of the drive machine 22 is connected to the wheels via a transmission 26 to drive the motor vehicle 10. A stiffening element 28 in the form of a hollow body also is mounted on the mounting frame 20. An electrical component of the electrically driven motor vehicle 10 may be accommodated in the hollow body 28 to reinforce the stiffening element 28 mechanically and to utilize the structural space in the hollow body 28. The mounting frame 20 has two elongate longitudinal beams 30, 32 that extend parallel to the longitudinal axis 16 and toward an end of the motor vehicle 10. The longitudinal beams 30, 32 are mounted on a transverse beam 34 or on the supporting frame 12 of the motor vehicle. The longitudinal beams 30, 32 form a frame arrangement that is open out in the longitudinal direction 18 and extend as free beams parallel to the longitudinal axis 16 and toward an end of the motor vehicle 10 or an end of the supporting frame 12. The electric drive machine 22 is arranged and mounted between the longitudinal beams 30, 32. The stiffening element 28 is mounted on the two longitudinal beams 30, 32, and is connected fixedly and mechanically to the longitudinal beams 30, 32 by fixing means, so as to be offset with respect to the electric drive machine 22. The stiffening element 28 is a rigid and flexurally stiff hollow body 28 that is mounted on a distal end 38 of each of the longitudinal beams 30, 32 and mechanically connects the distal ends 38 of the longitudinal beams 30, 32 to one another. The stiffening element or hollow body 28 forms a closed frame section together with the free longitudinal beams 30, 32 and defines a transverse strut that connects the longitudinal beams 30, 32 to one another.

An electrical energy store or battery 40 also is mounted on the mounting frame 20 and can be connected electrically to the electric drive machine 22 to supply electrical energy to the electric drive machine 22. In this embodiment, the electrical energy store 40 is arranged between the electric drive machine 22 and the transverse beam 34.

The stiffening element 28 is mounted to be offset outward relative to the electric drive machine 22 and the electrical energy store 40 in the longitudinal direction 18, whereas the electric drive machine 22 and the electrical energy store 40 are mounted to be offset inward relative to the stiffening element 28 in the longitudinal direction 18. In other words, the stiffening element 28 is in front of the electric drive machine 22 in a collision direction of the motor vehicle. In this way, the longitudinal beams 30, 32 and the electric drive machine 22 and the stiffening element 28 form a block. The stiffening element 28 is mounted at the outside relative to the electrical components in the longitudinal direction 18 so that, in the event of the motor vehicle 10 being involved in a collision, the electrical components are protected and correspondingly hazardous overvoltages caused by damaged electrical components are prevented.

The stiffening element 28 stabilizes the mounting frame 20 and replaces those components of the motor vehicle 10 that are absent due to the electric drive, so that the mounting frame 20 together with the stiffening element 28 and the electric drive machine 22 forms a massive block that affords the required stability and a corresponding crumple zone in the event of the motor vehicle 10 being involved in a collision. In this way, the supporting frame 12 and the mounting frame 20, which normally are configured for motor vehicles with internal combustion engines, also can be used for electrically driven vehicles. Thus, corresponding mounting points of the internal combustion engine and the required transmission function for mounting of the electric drive machine 22 and of the stiffening element 28. The absent massive components such as, for example, the engine block and the transmission of the internal combustion engine drivetrain can thus be replaced by the electric drive machine and the stiffening element 28.

The stiffening element 28 is a hollow body 28 and can accommodate an electrical component, such as the power electronics of the electric drive 22 or a charging unit for the charging of the electrical energy store 40, to increase the stability of the stiffening element 28 and simultaneously utilize the structural space. The electrical components normally have a massive metallic cooling body. Thus, arranging the electrical component in the hollow body 28 for the block formation further improves the stiffening of the mounting frame 20.

In an alternative embodiment, the stiffening element 28 is a hollow body with a framework structure in the interior for increasing the mechanical stability of the stiffening element 28. The framework structure preferably is connected mechanically to the fixing means 36 or the corresponding mounting points so that, in the event of the motor vehicle 10 being involved in a collision, the collision energy is conducted from the stiffening element 28 into the longitudinal beams 30, 32.

The fixing means 36 may be screws, rivets or weld spots for fixing the stiffening element 28 to corresponding mounting points on the respective longitudinal beams 30, 32. The hollow body 28 preferably is connected by its respective side surfaces, in each case in an aerial fashion, to the longitudinal beams 30, 32.

The longitudinal beams 30, 32 have a multiplicity of buckling sections (not illustrated in any more detail here) that function as predetermined breaking points or buckling folds for the longitudinal beams 30, 32. The buckling sections are intended to ensure predefined bending behavior of the mounting frame 20 in the event of a collision to realize control bending of the supporting frame components. In this way, the crumple zone of the motor vehicle 10 can be improved.

An adaptation element 42 is arranged between the stiffening element 28 and the electric drive machine 22. The adaptation element 42 preferably bears against the stiffening element 28, and a surface of the adaptation element facing toward the electric drive machine 22 has a form, structure or contour corresponding to the surface of the electric drive machine 22. The adaptation element 42 contributes to the stabilization of the mounting frame 20 and to the block formation in the event of the motor vehicle 10 being involved in a collision that deforms the mounting frame 20. For this purpose, the adaptation element 42 preferably has a planar surface that faces toward the stiffening element 28, and a concavely curved surface that faces toward the electric drive machine 22. The adaptation element 42 may bear areally both against the stiffening element 28 and also against the drive machine 22.

The adaptation element 42 may be a plastics element composed, for example, of hard rubber, or may be a metallic element composed, for example, of aluminum. The adaptation element 42 preferably has a honeycomb structure to provide high stability, and thus highly effective block formation, while being of low weight.

Figure 2:
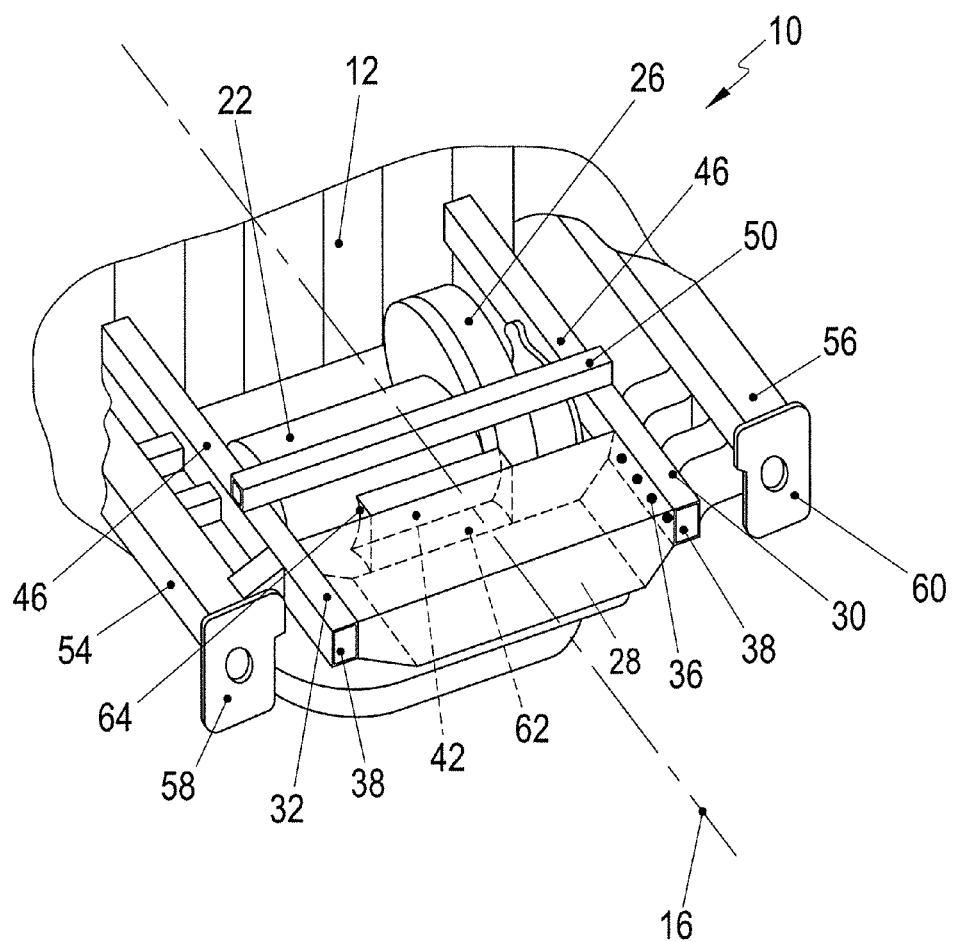
FIG. 2 is a perspective, schematic detail view of a motor vehicle having a mounting frame for the mounting of electrical components.

FIG. 2 schematically illustrates a perspective detail view of the motor vehicle 10 with the supporting frame 12. Identical elements are denoted by the same reference signs, wherein only the special features will be explained here.

The longitudinal beams 30, 32 extend parallel to the longitudinal axis 16 and are elongate straight rods with a hollow rectangular profile to save weight. The electric drive machine 22 and the transmission 26 are mounted between the longitudinal beams 30, 32. The longitudinal beams 30, 32 are connected, in a central section 46, by a transverse beam 50 to afford improved mounting capabilities for components and to increase the stability in this region. The stiffening element 28 is mounted on the distal ends 38 of the longitudinal beams 30, 32 to connect the longitudinal beams 30, 32 to one another mechanically fixedly and to form a closed frame section, as will be explained in more detail below.

In each case one longitudinal section 54, 56 of the supporting frame 12 is formed laterally adjacent to the longitudinal beams 30, 32. Each longitudinal section has a connection section 58, 60 for connecting a bumper to the supporting frame 12.

The stiffening element 28 is arranged between the distal ends 38 of the longitudinal beams 30, 32 and is connected fixedly to the longitudinal beams 30, 32 by the fixing means 36. The stiffening element 28 is a box or block with a cavity, which, in one embodiment, may receive electrical component. The adaptation element 42 is between the electric drive machine 22 and the stiffening element 28. More particularly, the adaptation element 42 has a planar surface 62 fixed to the stiffening element 28 and a concave surface 64 that faces the electric drive 22. The concave surface 64 improves the mechanical contact between the stiffening element 28 and the electric machine 22 in the event of the motor vehicle 10 being involved in a collision and also improves the block formation by the stiffening element 28 and the electric machine 22. The concave surface 64 may be spaced from or bear against the electric drive machine 22. The adaptation element 42 preferably has a honeycomb structure, and is formed from plastic, such as hard rubber, or from metal, such as aluminum. The adaptation element 42 improves the block formation by the stiffening element 28 and the electric drive machine 22.

Figure 3A:
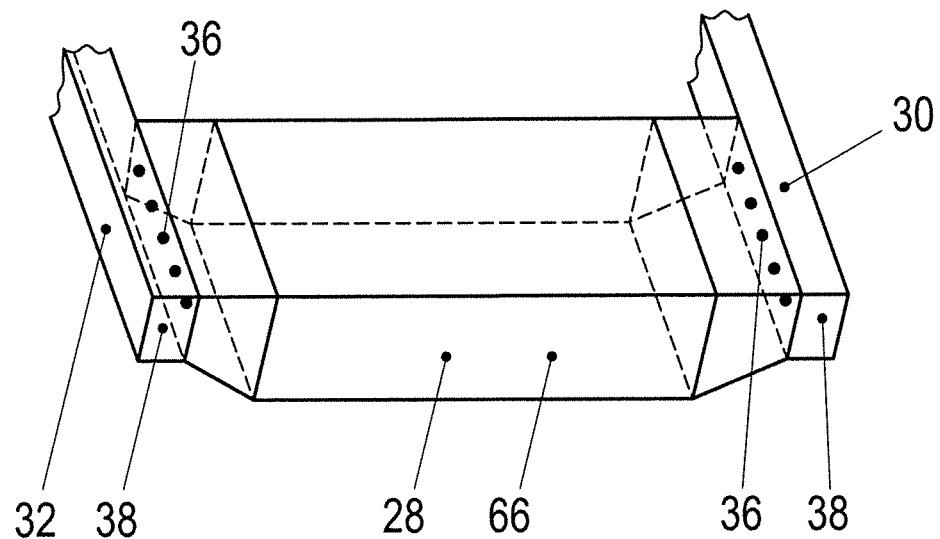
FIGS. 3a and 3b show perspective detail views of a hollow body for forming a block with the mounting frame.

FIG. 3a schematically illustrates an embodiment of the stiffening element 28. Identical elements are denoted by the same reference signs, and only the special features will be explained here. The stiffening element 28 is fixed to the distal ends 38 of the longitudinal beams 30, 32, as explained above. The stiffening element 28 has a cavity 66 that reduces weight and may accommodate an electrical component of the electric drive, such as an inverter or a charging unit for the charging of the electrical energy store 40. The flexurally stiff and massive metal housing of the stiffening element 28 forms a mechanical connection between the two longitudinal beams 30, 32.

Figure 3B:
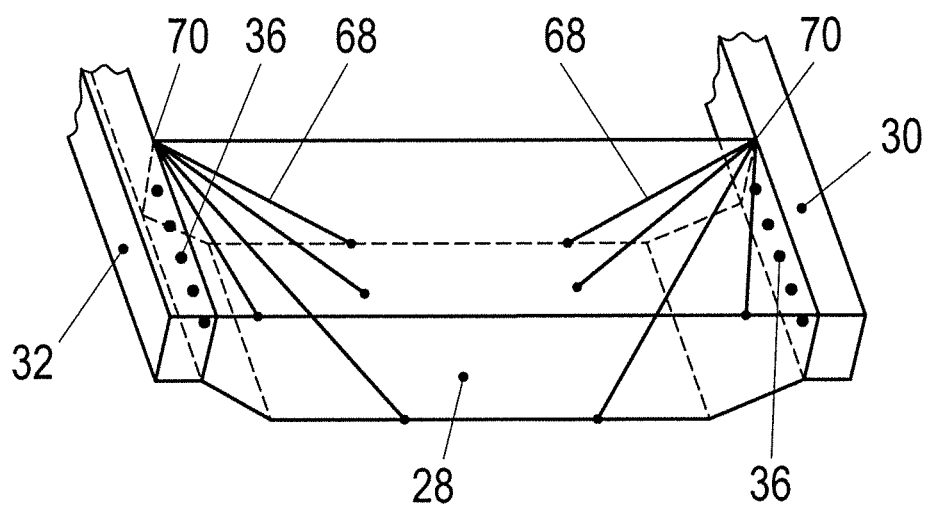

FIG. 3b schematically illustrates an alternative embodiment of the stiffening element 28. Identical elements are denoted by the same reference signs, wherein only the special features will be explained here. The stiffening element 28 is a hollow body with stiffening struts 68 therein to form a framework structure. The stiffening struts 68 extend in radiant fashion or in a V-shape in different directions in the stiffening element 28 proceeding from a mounting point 70. The mounting point 70 forms a mechanical connection of the stiffening element 28 to the respective longitudinal beam 30, 32, and is assigned one of the fixing means 36. The framework structure formed by the stiffening struts 68 in the cavity of the stiffening element 28 increases the mechanical stability of the stiffening element 28 in targeted fashion. Thus, in the event of the motor vehicle 10 being involved in a collision, the stiffening struts 68 transmit the collision energy via the mounting points 70 to the mounting frame 20, and thereby transmit and distribute the collision energy.

What is claimed is:

1. A mounting frame for an electrically driven motor vehicle, the electrically driven motor vehicle having opposite first and second longitudinal ends spaced apart along a longitudinal direction of the vehicle and a passenger compartment between the longitudinal ends, the electrically driven motor vehicle further having a supporting frame with longitudinal sections at opposite left and right sides of the electrically driven motor vehicle, the mounting frame being between the passenger compartment and the first longitudinal end and comprising: two longitudinal beams oriented in the longitudinal direction of the motor vehicle and having first ends in proximity to the first end of the motor vehicle, the longitudinal beams of the mounting frame being between the longitudinal sections of the supporting frame and being connected to the longitudinal sections of the supporting frame at a plurality of positions, an electric drive unit for driving the motor vehicle being mounted on the longitudinal beams at positions between the passenger compartment and the first ends of the longitudinal beams, and a flexurally stiff hollow body formed separately from the longitudinal beams and being arranged between the first ends of the longitudinal beams, the hollow body being mechanically fixedly connected to the longitudinal beams at a plurality of positions along the longitudinal direction so that the hollow body and the longitudinal beams form a closed frame section with the electric drive unit being between the hollow body and the passenger compartment in the longitudinal direction.

2. The mounting frame of claim 1, wherein the hollow body is fixed to the longitudinal beams by connecting means.

3. The mounting frame of claim 1, further comprising an electrical energy store for supplying electrical energy to the drive unit, the electrical energy store being mounted on the longitudinal beams, and the energy store being between the hollow body and the passenger compartment in the longitudinal direction.

4. The mounting frame of claim 1, further comprising stiffening struts in the hollow body.

5. The mounting frame of claim 1, further comprising an adaptation element arranged between the hollow body and the drive unit.

6. The mounting frame of claim 5, wherein the adaptation element is formed from plastic.

7. The mounting frame of claim 5, wherein the adaptation element is formed from metal.

8. The mounting frame of claim 5, wherein the adaptation element has a honeycomb structure.

9. The mounting frame of claim 5, wherein the adaptation element has a planar surface that faces toward the hollow body.

10. The mounting frame of claim 1, wherein an electrical component of the electrically driven motor vehicle is accommodated in the hollow body.

11. The mounting frame of claim 1, wherein the hollow body is in the form of a closed hollow body.

12. The mounting frame of claim 1, wherein at least parts of the drive unit and at least parts of the hollow body are at identical heights at positions thereon extending between the longitudinal beams of the mounting frame.

13. The mounting frame of claim 1, further comprising an electrical energy store mounted to the longitudinal beams at a position between the drive unit and the passenger compartment.

14. The mounting frame of claim 1, wherein the hollow body is cross-sectionally larger than the longitudinal beams.

15. A mounting frame for an electrically driven motor vehicle having opposite first and second longitudinal ends spaced apart along a longitudinal direction of the vehicle and a passenger compartment between the longitudinal ends, the mounting frame being between the passenger compartment and the first longitudinal end and comprising: two longitudinal beams oriented in the longitudinal direction of the motor vehicle and having first ends in proximity to the first end of the motor vehicle, an electric drive unit for driving the motor vehicle being mounted on the longitudinal beams at positions between the passenger compartment and the first ends of the longitudinal beams, and a flexurally stiff hollow body formed separately from the longitudinal beams and being arranged between the first ends of the longitudinal beams, the hollow body being mechanically fixedly connected to the longitudinal beams at a plurality of positions along the longitudinal direction so that the hollow body and the longitudinal beams form a closed frame section with the electric drive unit being between the hollow body and the passenger compartment in the longitudinal direction, and wherein stiffening struts are mounted in the hollow body at mounting points where the hollow body is mounted on the longitudinal beams, the stiffening struts extending radially from the respective mounting points.

16. The mounting frame of claim 15, wherein the electrically driven motor vehicle has a supporting frame with longitudinal sections at opposite left and right sides of the electrically driven motor vehicle, the longitudinal beams of the mounting frame being between the longitudinal sections of the supporting frame and being connected to the longitudinal sections of the supporting frame at a plurality of positions.

* * * * *